Feb. 4, 1969　　　　　　　H. FREI　　　　　　　3,425,264
METHOD AND APPARATUS FOR DETECTING A LEAK IN A HEAT EXCHANGER
Filed Sept. 27, 1966

Inventor:
HANS FREI
BY
Kenyon & Kenyon
ATTORNEYS

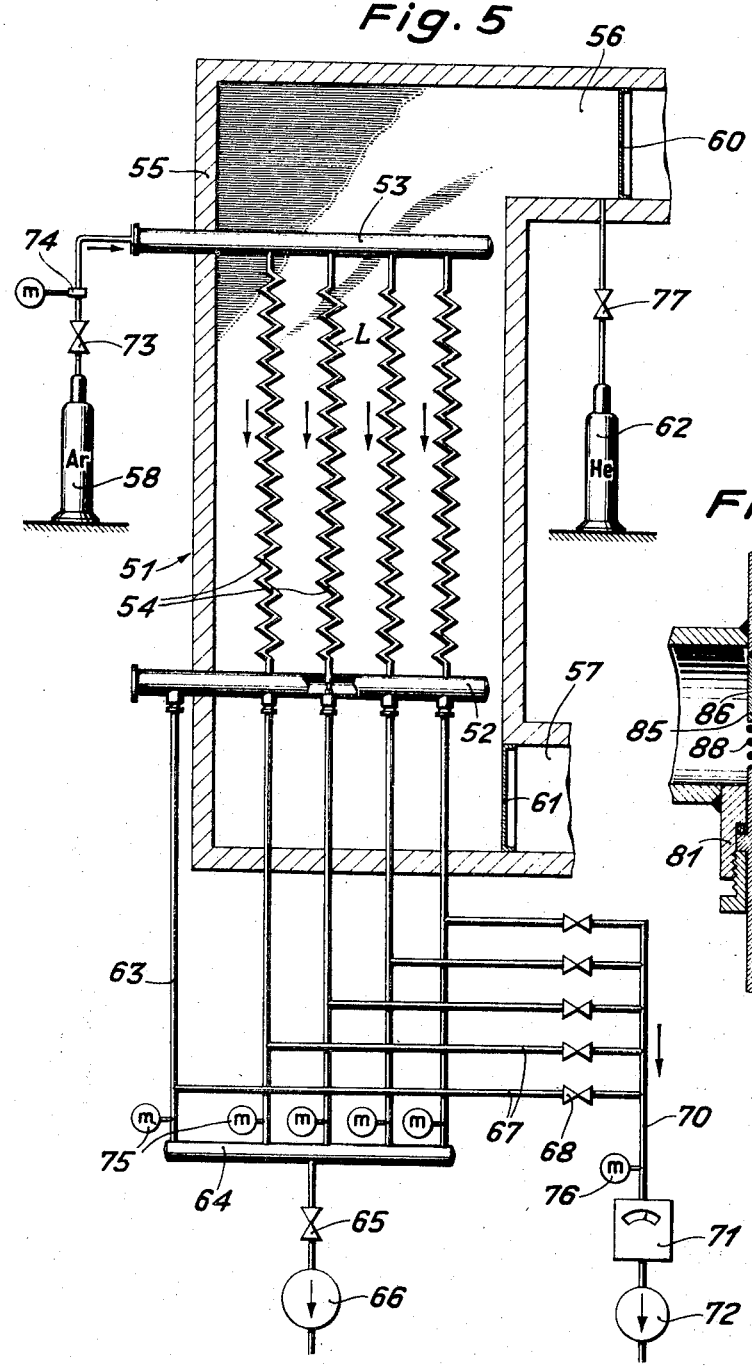
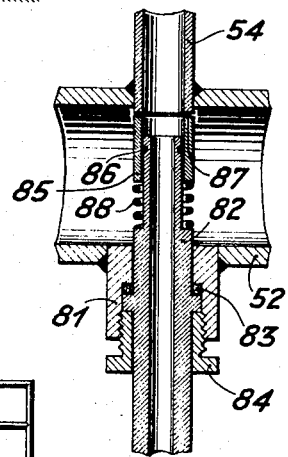

United States Patent Office 3,425,264
Patented Feb. 4, 1969

3,425,264
METHOD AND APPARATUS FOR DETECTING A LEAK IN A HEAT EXCHANGER
Hans Frei, Winterthur, Switzerland, assignor to Sulzer Brothers Limited, Winterthur, Switzerland, a corporation of Switzerland
Filed Sept. 27, 1966, Ser. No. 582,330
Claims priority, application Switzerland, Oct. 5, 1965, 13,736/65
U.S. Cl. 73—40.5   12 Claims
Int. Cl. G01m 3/04, 3/08; F28f 11/00

ABSTRACT OF THE DISCLOSURE

A plurality of pipelines are connected between a pair of headers. The pipelines are surrounded by an atmosphere of a gaseous tracer medium and samples of flow are removed from each of the pipelines between the headers. A detector is used to detect the samples of gas flow removed from the pipeline to detect leaks therein.

---

The invention relates to a method and apparatus for detecting a leak in a heat exchanger. More particularly, the invention relates to a method and apparatus for detecting leaks in a plurality of parallel pipelines in a heat exchanger. Still more particularly, the invention relates to a method and apparatus of detecting leaks in the pipelines of a heat exchanger by the use of gaseous mediums.

Heretofore, in order to detect leakage in heat exchangers, for example, in nuclear reactor installations in which a gas such as carbon dioxide yields heat to water or steam in a heat exchanger the individual pipeline had to be sealed at two sides after emptying. Thereafter, either a suction device had to be connected to the pipelines or else a pressure gas had to be fed to the pipelines. Where tracer media were preferably used, such media had to be detected by means of special detectors even in the most minute quantities. This method, however, has been disadvantageous in that sealing of the pipelines on all sides has necessitated a considerable number of sealing elements or closable apertures for introduction of the sealing elements.

Generally, the invention utilizes a method and apparatus for detecting leaks in a plurality of parallel pipes connected betwen a pair of headers of a heat exchanger which introduces a flow of scavenging gas under negative pressure into the pipelines upstream of a suspected leak to avoid the need for sealing off the individual pipelines while surrounding the pipelines with a gaseous tracer medium. While the pipelines are connected in common by at least one header, samples of the gas flows in the pipelines are then taken downstream of the pipelines and checked for tracer medium content.

When a leak exists in a pipeline, the tracer medium passes into the pipeline at the point of the leak due to the negative pressure and becomes entrained in the gas flow. Thus, when the gas flow is sampled and checked, any measurement of tracer medium indicates a leak. Further, the amount of tracer medium found is indicative of the location of the leak.

The apparatus of the invention includes a plurality of pipes which are connected in sealing tight relation to the pipelines within a header of a heat exchanger. The connection is effected by connecting elements on the pipes which are introduced in sealing relationship into openings in the header and which have flexible portions for bearing against the orifices of the pipelines. The ends of the pipes are connected in common to a suction device for creating a suction on the gas introduced into the pipelines to create a gas flow towards the suction device. In addition, the pipes are intermediately connected to a detector means to which samples of the gas flow are sent in order for the detector to detect the presence of any tracer medium.

Accordingly, it is an object of the invention to utilize a minimum of openings in the pipelines of a heat exchanger for detecting leaks in the pipelines.

It is another object of the invention to provide a simple efficient method and apparatus for detecting leaks in the pipelines of a heat exchanger.

It is another object of the invention to connect the pipelines of a heat exchanger in common for detecting leaks therein.

These and other objects and advantages of the invention will become more apparent from the following detailed description and appended claims taken in conjunction with the accompanying drawings in which:

FIGURE 5 illustrates a schematic view of a heat exchanger embodying the invention; and FIGURE 6 illustrates an enlarged cross sectional detail of a connecting element communicating a pipe to a pipeline of the heat exchanger of FIGURE 5.

Figure 1:
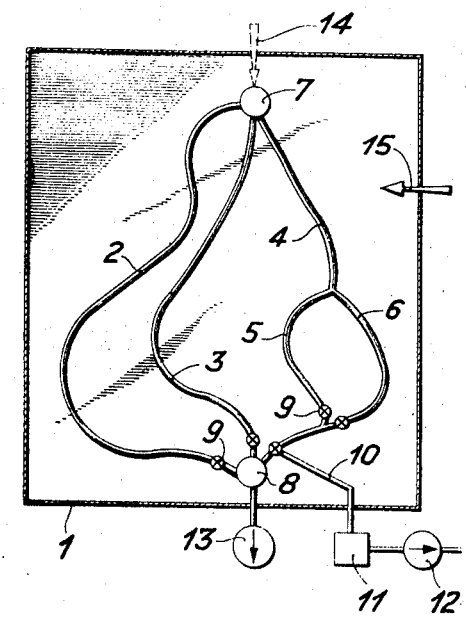
FIGURES 1 to 4 illustrate schematic embodiments of the principles of the invention.

Referring to FIGURE 1, the principle of the invention in general utilizes a tank 1 in which a plurality of parallel pipelines 2, 3, 4, 5 and 6 are disposed and connected to and between two headers 7 and 8. For the sake of clarity the drawing does not show the connections of the headers to the destination of the medium flowing through them, nor the connections to the tank 1. The pipelines each have connections 9 so that a leakage location device can be connected to the individual connections 9 for a leakage check. The leakage location device includes a pipeline 10, a detector 11 and a vacuum pump 12. In addition, a vacuum pump 13 is connected to the header 8.

If it is required to check for or locate a leakage by the method according to the invention between that part of the heat exchanger which is situated between the headers 7 and 8, the vacuum pump 13 is started. At the same time it is preferable for the pipelines (not shown) leading out from the headers 7 and 8 to be sealed or separated, although this is not absolutely essential. The suction effect of the vacuum pump 13 produces a flow of gas in the pipelines 2 to 6 and this gas flow through the various pipelines in parallel to the header 8. The flow may, for example, consist of a gas which is left behind in the pipelines after the headers 7 and 8 have been shut off, or the vapor of a remaining liquid, e.g. water. It is, however, preferable to feed a neutral gas, e.g. argon, as scavenging gas to the header 7 as shown by arrow 14. A tracer medium, e.g. helium, is also introduced into the tank 1 as shown by arrow 15.

If there is a leak at any place in one of the pipelines then the negative pressure produced in the pipelines by the suction effect causes tracer medium to enter the pipes from the tank 1. The tracer medium is then entrained in the pipes mainly by the gas flow in the pipes and taken past one or more of the connections 9. Any return flow of tracer medium is prevented or at least greatly obstructed by the gas flow. By reference to the samples, information regarding the position of the leakage can be reduced from the measured results of the detector 11 which in this case is connected to the connections successively, while the concentration and its curve per unit of time in the event of variations of the admission or of the flow of scavenging gas allow estimates of the position of the leak in the longitudinal direction of the pipe concerned.

In principle, there is no need for the pressure in the pipelines to be lower than in the tank surrounding the pipelines. The decisive factor for the penetration of the tracer medium is its partial pressures outside and inside the pipe system. A negative pressure in the pipe system, however, assists the penetration of the tracer medium through leaks.

Figure 2:
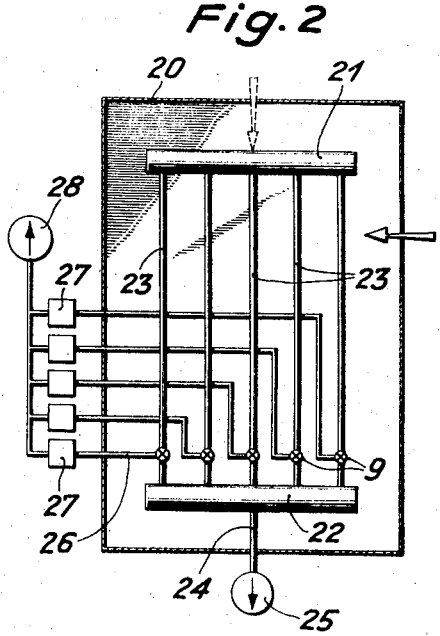

Referring to FIGURE 2, a tank 20 which has headers 21, 22 and pipelines 23 disposed therein has a vacuum pump 25 connected by a pipeline 24 to header 22. In addition, the pipelines 23 are provided with connections 9 which connect to the pipelines 26 of detectors 27 disposed in parallel and the detectors 27 are led jointly by conduits to a vacuum pump 28.

In the system shown in FIGURE 2 unlike the arrangement shown in FIGURE 1, a plurality of detectors is used instead of just a single detector and in this case there are as many detectors as there are pipelines. If gas is sucked off by the vacuum pump 25 during an investigation while tracer medium is being introduced into the tank 20, parallel gas flows again from in the pipelines and pass the connections 9. The vacuum pump 28 sucks a relatively small amount of the gas flow from all the connections 9 simultaneously and feeds it to the detectors 27. Simultaneously reading of the group of detectors shown in FIGURE 2 gives more accurate information concerning the position of a leakage and in particular dynamic processes can also be examined in this way, e.g. a momentary addition of tracer medium to the gas in the tank 20. In some cases, the behavior of the individual detector readings per unit of time will give more accurate information on the position of the leak than if just a single detector is used as shown in FIGURE 1.

Figure 3:
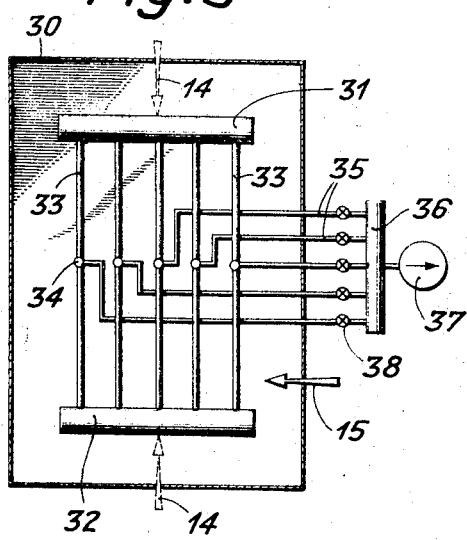

Referring to FIGURE 3, a tank 30 contains headers 31 and 32 connected by pipelines 33 which have connections 34 near their middle. The connections 34 are connected to pipes 35 which lead to an auxiliary header 36 connected to a vacuum pump 37 and which are provided with connections 38 for the detectors. With this system, the action of the vacuum pump 37 produces a flow from the headers 31, 32 to the center of the pipelines 33. The flow extends through the pipes 35 and past the connections 38. Connection of a detector in the manner shown diagrammatically in FIGURE 1 enables the gas flows in the individual pipes 35 and hence the individual pipelines 33 to be checked for traces of tracer medium.

Figure 4:
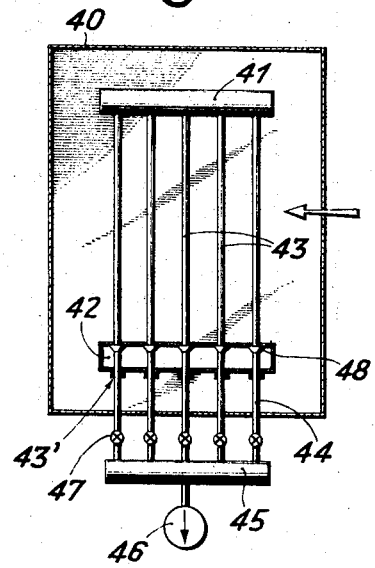

Referring to FIGURE 4, another system has a tank 40 containing headers 41, 42 and pipelines 43. Header 42 has closable apertures 43′ which extend outwardly and which are situated opposite the orifices of the pipelines 43 in the header 42 (as illustrated). The pipes 44 of a suction device which have connections 47 for one or more detectors are introduced through the apertures 43′ in sealing-tight relationship and lead to a header 45 in operative communication with a vacuum pump 46. The pipes 44 also have special elements 48 which, when secured in the header 42, provide a sealing-tight connection enabling gas to escape from the pipeline 43 into the pipe 44 but prevent or at least greatly throttle any entry of gas to the pipe 44 from the header 42. This system operates in substantially the same way as the systems described above, however the system also enables the connections for the suction pipes to be disposed in the header at a place where the connections can be more satisfactorily made than in occassionally thin pipes. Also, the connections are usually more accessible than if they were in the pipelines. In addition, any leaks in the header 42 can be detected, to which end a separate pipe with a detector as shown in FIGURE 1 is connected to the header 42, although this is not shown in FIGURE 4.

Referring to FIGURE 5, a heat exchanger 51 of the invention includes headers 52, 53 and interposed communicating pipelines 54 disposed in a tank 55 connected by ducts 56 and 57 to a heat vehicle circuit, e.g. the circuit of a nuclear reactor cooling gas. The headers 52, 53 together with the pipelines 54 have a flow of water through them, the water being evaporated and superheated in the heat exchanger. The arrangement is substantially the same as in the diagram shown in FIGURE 4.

If a leak is found in the system comprising the headers 52, 53 and the pipelines, for example, as a result of a water content in the gas circuit or a gas content in the water circuit, the pipelines and headers are emptied. Thereafter, the headers are partially closed and the header 53 is connected to a source 58 of a scavenging gas, which may, for example, be a neutral gas, e.g. argon. Next, the ducts 56 and 57 are sealed off by sealing walls 60 and 61, whereupon the interior of tank 55 is connected to a source 62 of a tracer medium, e.g. helium. The use of a flow of scavenging gas thus eliminates the need for sealing off the individual pipelines upstream of a suspected leak.

The individual pipelines 54 are connected to the header 52 to a system of pipes 63 leading to a common header 64 which is connected to a vacuum pump 66 via a shut-off and throttle element 65. The pipes 63 are connected to pipe connections 67 which contain valves 68 and branch from the pipes 63 to a common pipe 70. The pipe 70 leads to a detector 71 connected to a vacuum pump 72 which draws the samples through the pipe connections and detector. In addition, a valve and throttle element 73 is connected between the source 58 of scavenging gas and the header 53 and may, for example, be combined with a pressure controller. Element 73 is also associated with a flow meter 74 for measuring the flow of gas into header 53. Also, the pipes 63 contain flow meters 75 and pipe 70 contains a flow meter 76 for measuring flow therein. The source 62 of tracer gas is provided with a pressure control valve 77 for regulating the pressure of tracer medium delivered into the heat exchanger tank 55.

A leak is located as follows: vacuum pump 66 is operated and throttle elements 65 and 73 are opened. The throttling action of the throttle elements is then adjusted to give the required flow of scavenging gas through headers 52, 53, pipelines 54 and pipes 63. The pressure at the pressure control valve 77 is set to give a higher pressure in the interior of tank 55 than in the system consisting of the pipeline and headers, so that in the event of a leak the tracer medium will enter the system.

The pressure of tracer medum is detected by opening the valve 68 with the vacuum pump 72 switched on. If a mixture of scavenging gas and tracer medium is flowing in one of the pipes 63, it will be detected by the detector 71 when the associated valve 68 is opened. The size of the leak can be assessed from the content of tracer gas in the gas flow through the detector and its ratio to the gas flow through the pipes 63, other conditions being taken into account, e.g. gas pressure in the tank and gas pressure in the pipe system. Evaluation of the detector response to an abrupt variation in the scavenging gas flow also enables the position of the leak with respect to the pipe length to be localized, regard being had to the volumes.

Adjustment of the flow through the pipe 63 and through the detector 71 by means of the vacuum pump 66 and the throttle elements 65, 73 in the pipelines enables the ratio of tracer medium to scavenging gas to be adjusted so that the detector 71 operates under optimum conditions. In order to increase the detector sensitivity, a scavenging gas is used which is condensable in the plant and which can be separated in a cooling trap.

Referring to FIGURE 6, the header 52 is provided with a plurality of internally screw-threaded connections 81. Each connection 81 is closeable by a screw (not shown) and has a bore which is situated in continuation of the axis of the pipe 54, the inside diameter of which is larger than the inside diameter of pipe 54. A connecting element 82 which is situated at the end of an associated pipe 63 is introduced through the bore of the screw-threaded connection 81 and secured in the connection 81 in sealing-tight relation by means of a gasket 83 and a hollow externally threaded screw 84. The connecting element 82 has a tapered or shouldered end on which a bush 85 is mounted in concentric relation with a slight clearance. A gasket 86 is provided between the tapered end of the connecting element 82 and the bush 85 to provide a seal. The end face of bush 85 has a gasket 87 to cooperate with the end face of the associated pipeline 54 with which the connecting element is in sealing relation. A spring 88 is mounted on the tapered end of the connecting element 82 to press the bush 85 against the end face of pipeline 54 when the connecting element 82 is in the secured position.

The connecting element 82 provided according to the invention also enables the header 52 to be sealed off from the interior of the heat exchanger and enables the pipe 63 to be connected to the associated pipeline 54 in sealing-tight relationship.

For detection of leaks in the headers or in the welds between the pipes of the pipelines 54 and the header 52, the header itself or its interior is also adapted to be connected to the detector 71 and vacuum pump 72 by means of pipelines 63.

While the examples hereinbefore indicated are intended to explain the principle of the invention, various modifications of the examples described are possible without departing from the inventon. For example, samples can be taken from the pipelines, e.g. in the system shown in FIGURE 2, by introducing the pipes 26, like the pipes 44 in FIGURE 4, through openings in the header and as probes into the pipelines 23. In such conditions no seals are required for the pipe ends with respect to the pipe of the pipeline. In some cases it may be advantageous to provide gas sampling pipes when the heat exchanger is manufactured, said sampling pipes leading out of the heat exchanger and being shut-off during normal operation. Connections other than those shown in FIGURE 6 are also possible, more particularly connections adapted to be introduced through an opening in the header, said opening being smaller than the pipe diameter, and which have an expanding, e.g. inflatable, end for closing the pipe, or project into the pipe in the form of a probe as already indicated. Generally, however, the method according to the invention is not restricted to the use of the apparatus described by way of example.

What is claimed is:
1. A heat exchanger comprising:
a pair of headers,
a plurality of pipelines operatively connected in common between said headers in parallel relation,
means for introducing gas into one of said headers to produce parallel gas flows in said pipelines,
means for surrounding said pipelines with a gaseous tracer medium,
means for removing samples of gas flow from each of said pipelines downstream of said one of said headers, and
detector means for detecting tracer medium content in said removed samples of gas flow.

2. A heat exchanger as set forth in claim 1 wherein said means for removing samples of gas flow includes a plurality of pipes connected to respective pipelines of said pipelines, a third header connected in common to said pipes for receiving flow therefrom, a suction device connected to said third header downstream of said pipes for creating a negative pressure in said pipes, a connection communicating each of said pipes with said means for detecting tracer medium content and a vacuum pump connected downstream of said connection for drawing the samples through said connection and said detector means.

3. A heat exchanger as set forth in claim 2 wherein said header downstream of said pipelines includes a plurality of internally threaded connections, each of said threaded connections being disposed in axial alignment with an orifice of a respective one of said pipelines, and said pipes each includes a connecting element at an end thereof secured in said threaded connection in sealing relation for sealingly communicating said pipeline with said pipe in said header downstream of said pipelines.

4. A heat exchanger as set forth in claim 3 wherein each said connecting element has a bush sealingly mounted thereon and a means for resiliently urging said bush into sealing engagement with an end face of said pipeline.

5. A method of locating a leak in a heat exchanger having a plurality of pipelines disposed in parallel between a pair of headers comprising the steps of:
surrounding the pipelines with a gaseous tracer medium;
introducing a gas flow into each of the pipelines through one of the headers;
selectively removing a sample of gas flow from a pipeline downstream of the one header; and
checking the removed gas flow sample for tracer medium content.

6. A method as set forth in claim 5 wherein said gaseous tracer medium is helium.

7. A method as set forth in claim 5 wherein said sample of gas flow is removed by suction.

8. A method as set forth in claim 5 wherein said gas flows are introduced into the pipelines under suction.

9. A method as set forth in claim 5 wherein said gas flow is formed of a scavenging gas.

10. A method as set forth in claim 9 wherein said scavenging gas is argon.

11. A method as set forth in claim 9 wherein said scavenging gas is condensable whereby said scavenging gas is partially condensed before checking for tracer medium content.

12. A method as set forth in claim 5 wherein samples of gas flow are removed from the pipelines simultaneously.

References Cited
UNITED STATES PATENTS

| | | | |
|---|---|---|---|
| 2,486,199 | 10/1949 | Nier | 73—40.7 |
| 3,070,992 | 1/1963 | Nemeth | 73—40.7 |
| 3,087,327 | 4/1963 | Kagi | 73—40.7 |

FOREIGN PATENTS 1,017,919  1/1966  Great Britain.

OTHER REFERENCES

General Electric (GE), Leak Detectors, September 1958, cover and pp. 8–9.

Nier et al.: Mass Spectrometer for Leak Detection, in Journal of Applied Physics 18(1): pp. 30–33, January 1947.

ROBERT A. O'LEARY, *Primary Examiner.*

ALBERT W. DAVIS, *Assistant Examiner.*

U.S. Cl. X.R.

73—40.7; 165—70